P. KENNEDY.
MECHANICAL CONSTRUCTION OF STORAGE BATTERY CELLS.
APPLICATION FILED OCT. 3, 1906.
945,397.
Patented Jan. 4, 1910.
3 SHEETS—SHEET 1.
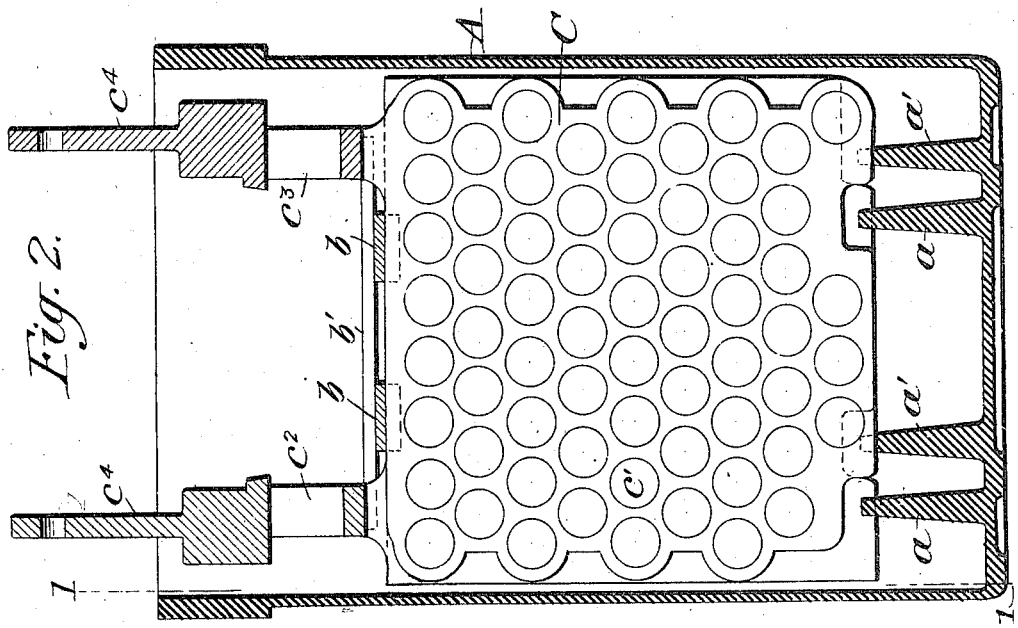
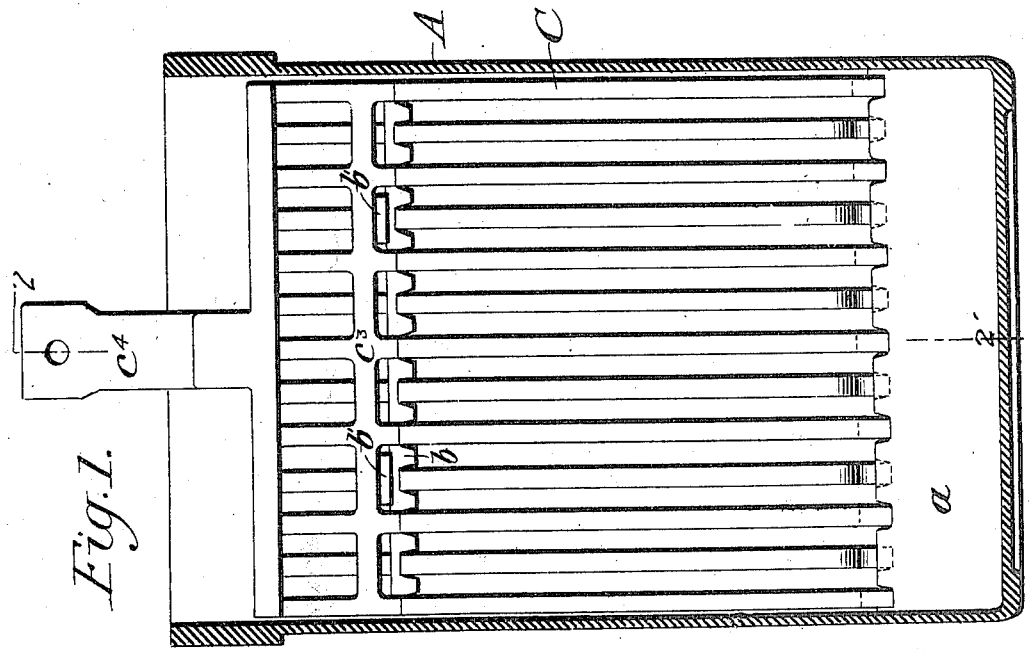

P. KENNEDY.
MECHANICAL CONSTRUCTION OF STORAGE BATTERY CELLS.
APPLICATION FILED OCT. 3, 1906.
945,397.
Patented Jan. 4, 1910.
3 SHEETS—SHEET 2.
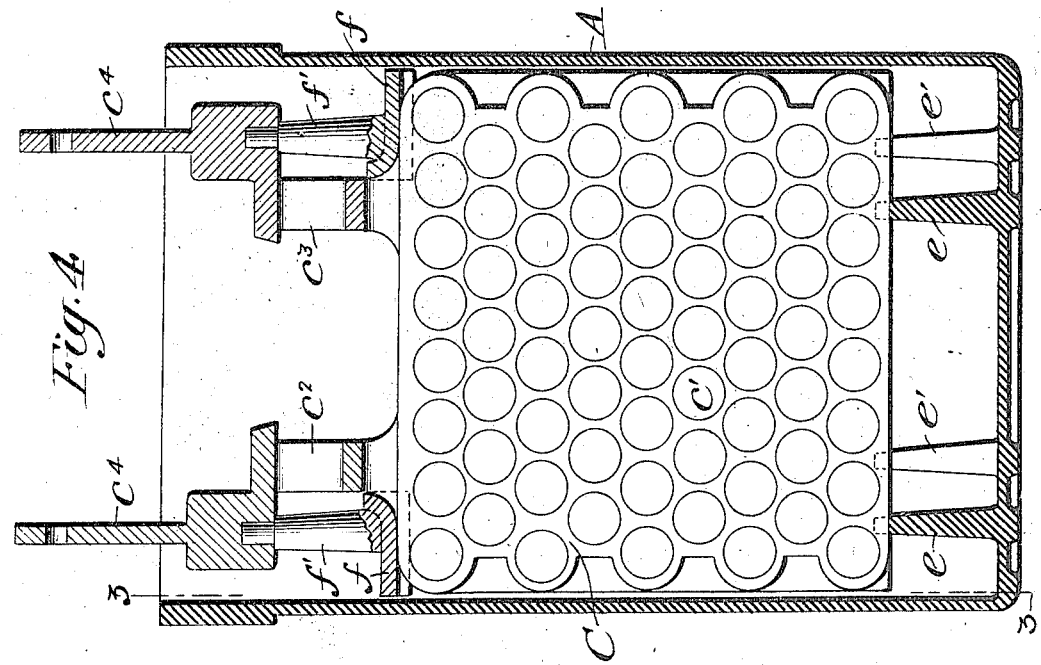
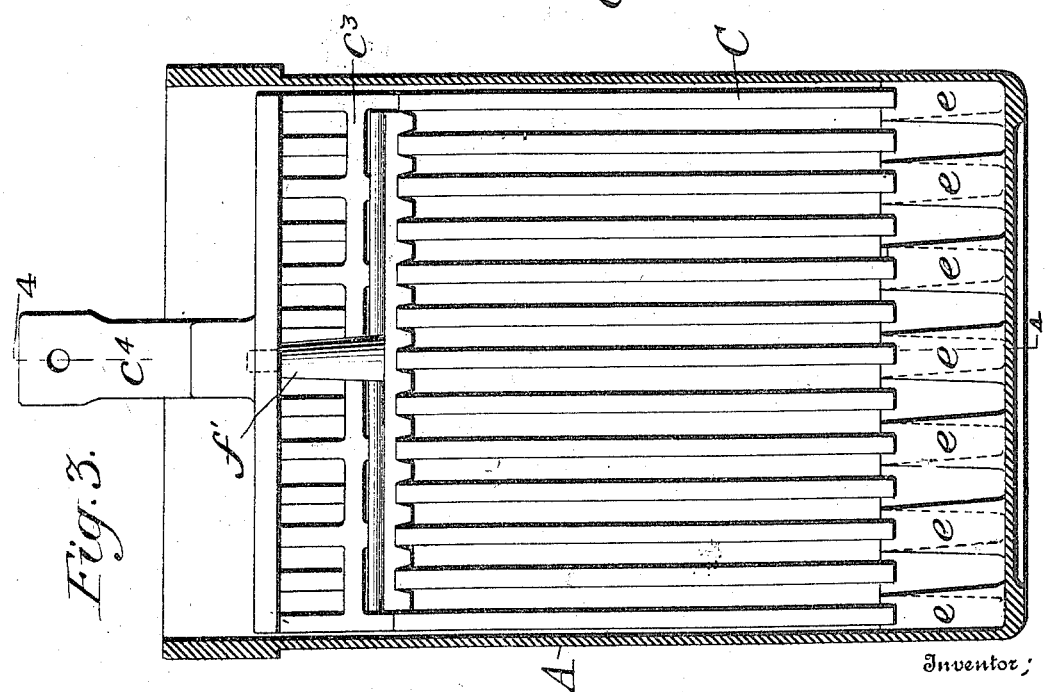
Witnesses.
Inventor:
Patrick Kennedy,
By
Attorneys

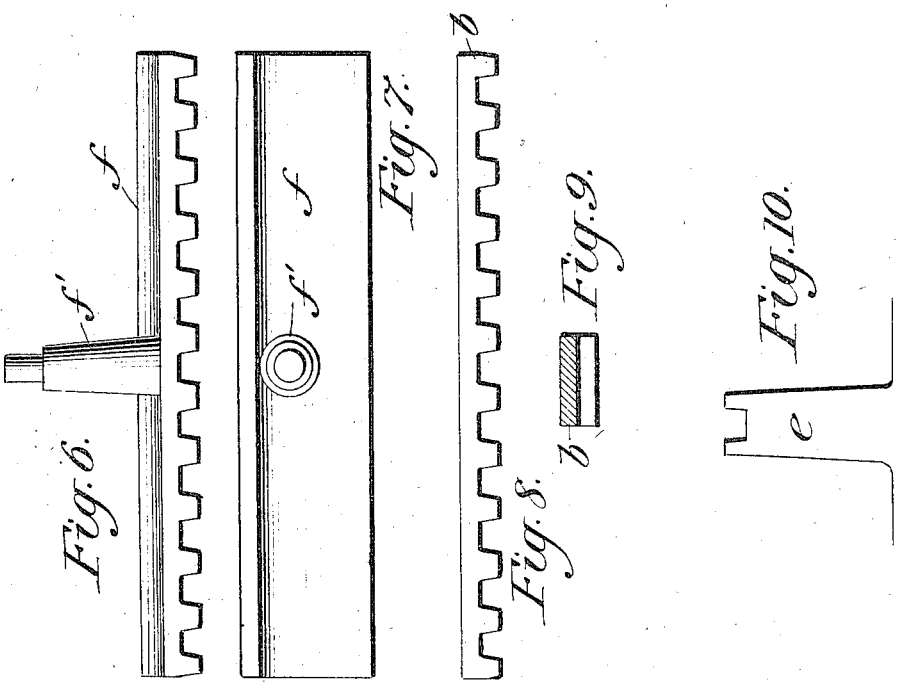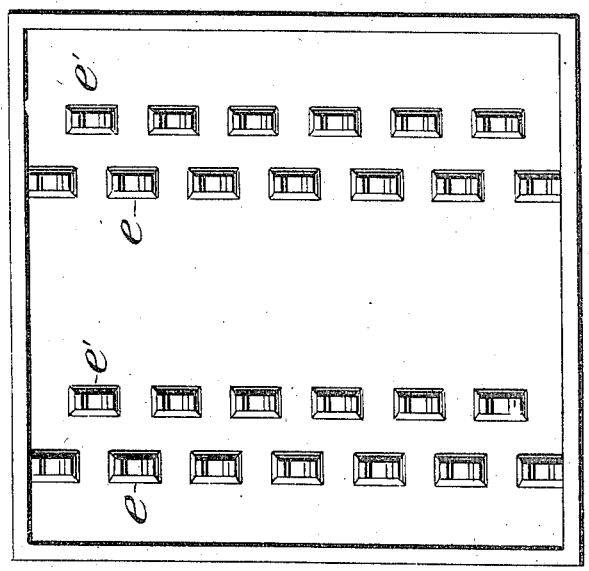

UNITED STATES PATENT OFFICE.

PATRICK KENNEDY, OF NEW YORK, N. Y., ASSIGNOR TO CONSOLIDATED RAILWAY ELECTRIC LIGHTING AND EQUIPMENT COMPANY, OF NEW YORK, N. Y., A CORPORATION OF MAINE.

MECHANICAL CONSTRUCTION OF STORAGE-BATTERY CELLS.

945,397.

Specification of Letters Patent.  Patented Jan. 4, 1910.

Application filed October 3, 1906. Serial No. 337,233.

*To all whom it may concern:*

Be it known that I, PATRICK KENNEDY, a citizen of the United States, residing at New York, in the county of New York and State of New York, have invented certain new and useful Improvements in Mechanical Construction of Storage-Battery Cells; and I do hereby declare the following to be a full, clear, and exact description of the invention, such as will enable others skilled in the art to which it appertains to make and use the same.

My improvements relate particularly to storage batteries having alternate positive and negative plates spaced apart and surrounded by a liquid electrolyte, and my object is to reduce to a minimum the liability to short circuits caused by the bridging over of the space between the plates by material which has become loosened and scales off the plates, or by any other material; and to provide separators for securely holding the plates in place which shall be of such character as to present no impediment to the currents through the electrolyte, and which do not interfere with the clearing away of any scale that may lodge between the plates.

My improvements will be fully understood from the following description and the accompanying drawing, in which—

Figure 1 is a section of one form of cell embodying my improvements, on the line 1—1 of Fig. 2. Fig. 2 is a section of the same on the line 2—2 of Fig. 1. Fig. 3 is a section of a modified form of cell embodying my improvements, on the line 3—3 of Fig. 4. Fig. 4 is a section on the line 4—4 of Fig. 3. Fig. 5 is a plan view of the jar shown in Figs. 3 and 4, with the plates removed. Fig. 6 is a side elevation of the separator shown in Figs. 3 and 4 on an enlarged scale. Fig. 7 is a plan view of the same. Fig. 8 is a side elevation of the separator shown in Figs. 1 and 2, on an enlarged scale. Fig. 9 is a cross-section of the same, and Fig. 10 is a detail view of one of the plate supporting posts of Figs. 3, 4 and 5.

Referring to Figs. 1, 2, 8 and 9, the jar A is preferably formed of some acid-resisting non-conducting material such as glass or hard rubber, and is provided on its bottom with four upstanding separator ridges $a$, $a$ and $a'$, $a'$; the ridges $a$, $a$, serving to support the plates of one polarity and the ridges $a'$, $a'$, serving to support the plates of the opposite polarity. The battery plates of opposite polarity are cut away alternately in the manner illustrated in Figs. 1, and 2, so that the plates which are resting on the ridges $a$, $a$, are out of contact with the ridges $a'$, $a'$, and the plates which are resting on the ridges $a'$, $a'$ are out of contact with the ridges $a$, $a$. By this construction the plates in contact with any ridge are all of the same polarity, and spaces are formed between the ridges into which scales and the like may fall without danger that the scales which lodge on the upper edges of the ridges will short circuit the plates. The ridges are provided with notches as shown to securely and evenly space the plates apart at the lower edge. The battery plates C are of the usual form having depressions $c'$ containing active material, all the plates of one polarity being united by the respective yokes $c^2$ and $c^3$ to which are connected the terminals $c^4$. The comb-shaped separators $b$, $b$, (see Figs. 8 and 9), preferably composed of insulating materials such as hard rubber or the like, engage the upper edges of the plates above the active material, and these separators are held in place by the clamps $b'$, $b'$, of which one or more may be provided, and which may be turned into place to take under the lower bars of the yokes $c^2$ and $c^3$. By this construction the plates are securely held in proper position, separated from one another, without the interposition of anything but the electrolyte between their active surfaces, the separators do not afford any lodgment for the particles of scale and the like, and the arrangement is such that a thin implement may readily be inserted between the plates to clean them and dislodge any scale or like material.

Referring to Figs. 3, 4, 5, 6, 7 and 10, in which I have illustrated a modification which secures somewhat more fully the advantages of my improvements and which is the form now preferred by me so far as the matter of efficiency is unaffected by the question of expense, in these figures the general form of the jar and battery plates is the same as in Figs. 1 and 2, but the separating and supporting ridges $a$, $a$ and $a'$, $a'$, are replaced by the individual supporting and separating posts e, e, and e', e'. In this modified form, furthermore, the separators f, for the upper edges of the plates, are comb-like structures having an up-turned edge adapted to fit over the bevels on the plate yokes, as shown in Figs. 4, 6 and 7. These separators are provided with upright posts f', the upper ends of which are adapted to fit within sockets in the under faces of the terminals $c^4$, as shown. It will be seen that these modifications give an additional security against the short circuiting of the plates by accumulated scales and the like on the supporting ridges, and afford separators which may be inserted and removed with the battery plates, are held securely in position, and do not interfere with the cleaning of the plates by an implement inserted between them.

It is characteristic of my improvements that the battery plates shall be held above the bottom of the jar by individual supports so constructed and arranged that the supports for the plates of one polarity are out of contact with the plates of the opposite polarity, and that the separators for the plates shall be so constructed and arranged that they are not at any point interposed between the active surfaces of the plates and yet are securely held in place so that they cannot be shaken out of position. These characteristics, so far as I am aware, are broadly new, and I desire that my broad claims shall be given a correspondingly generic interpretation. Moreover, the item of cost is of considerable importance in the construction of storage batteries, and on that and other accounts it is sometimes desirable to use only one or more of my improved features, and secure the advantages attendant on those features, discarding, in that particular case, the other improved features and their attendant advantages.

What I claim is:—

1. In a storage battery, a jar, two series of plates of opposite polarity therein, a narrow strip of insulating material extending across the upper edges of the plates and having depending teeth adapted to fit between the plates, and means for securing said strip in place, substantially as described.

2. In a storage battery, a jar, two series of plates of opposite polarity therein, two yokes uniting the respective series of plates and secured thereto near opposite sides of the jar, and strips of insulating material provided with notches engaging the upper edges of said plates and placed outside of the yokes, whereby the strips are held in place between the yokes and the sides of the jar, substantially as described.

3. In a storage battery, a jar, two series of plates of opposite polarity therein, two yokes uniting the respective series of plates, a narrow strip of insulating material extending across the upper edges of the plates and having depending teeth adapted to fit between the plates, and a rigid connection between a yoke and said strip, substantially as described.

4. In a storage battery, a jar, two series of plates of opposite polarity therein, four series of posts rising from the bottom of the jar, two of the said series of posts being staggered with respect to the other two series, notches in the tops of said posts adapted to engage the lower edges of the battery plates, strips of insulating material provided with notches adapted to engage the upper edges of said plates, and means for securing said strips in place substantially as described.

5. In a storage battery, a jar, two series of plates of opposite polarity therein, four series of posts staggered with relation to one another and provided with notches engaging the lower edges of said plates, the yokes $c^2$ and $c^3$, the terminals $c^4$, and the separators f provided with the posts f' engaging the terminals $c^4$, substantially as described.

In testimony whereof I affix my signature, in presence of two witnesses.

PATRICK KENNEDY.

Witnesses:
Aug. Treadwell,
William H. Davis.